United States Patent
Mizutani (10) Patent No.: US 11,947,824 B2
(45) Date of Patent: Apr. 2, 2024

(54) ELECTRONIC CONTROL UNIT, METHOD, AND PROGRAM

(71) Applicant: TOYOTA JIDOSHA KABUSHIKI KAISHA, Toyota (JP)

(72) Inventor: Taiki Mizutani, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/545,228

(22) Filed: Dec. 8, 2021

(65) Prior Publication Data

US 2022/0253234 A1 Aug. 11, 2022

(30) Foreign Application Priority Data

Feb. 8, 2021 (JP) ................................ 2021-018342

(51) Int. Cl.
  *G06F 3/06* (2006.01)
  *G07C 5/00* (2006.01)

(52) U.S. Cl.
  CPC .......... *G06F 3/0646* (2013.01); *G06F 3/0604* (2013.01); *G06F 3/0679* (2013.01); *G07C 5/008* (2013.01)

(58) Field of Classification Search
  CPC .... G06F 8/65; G06F 3/064; G06F 2212/7203; G06F 2212/7205
  See application file for complete search history.

(56) References Cited

U.S. PATENT DOCUMENTS

2020/0042181 A1* 2/2020 Lee ........................ G06F 3/0616
2021/0157529 A1* 5/2021 Sakurai ............... B60R 16/0231

FOREIGN PATENT DOCUMENTS

JP 2020-024579 A 2/2020

* cited by examiner

*Primary Examiner* — Duy Khuong T Nguyen
(74) *Attorney, Agent, or Firm* — Oliff PLC (57) ABSTRACT

An electronic control unit includes a volatile memory, a nonvolatile memory that includes a storage area including a data portion to which data loaded into the volatile memory is written and a margin portion which is an unused portion corresponding to the data, and a control unit configured to load the data of the nonvolatile memory into the volatile memory. The nonvolatile memory stores valid portion information which is information indicating the data portion. The control unit is configured to load the data of the nonvolatile memory into a storage area of the volatile memory based on the valid portion information.

4 Claims, 5 Drawing Sheets

ELECTRONIC CONTROL UNIT, METHOD, AND PROGRAM

CROSS-REFERENCE TO RELATED APPLICATION

This application claims priority to Japanese Patent Application No. 2021-018342 filed on Feb. 8, 2021, incorporated herein by reference in its entirety.

BACKGROUND

1. Technical Field

The present disclosure relates to an electronic control unit (ECU) which is mounted in a vehicle, a method, and a program.

2. Description of Related Art

A plurality of electronic control units (ECUs) for controlling operations of a vehicle is mounted in the vehicle. Each ECU includes a processor, a volatile storage unit (a volatile memory) such as a RAM, and a nonvolatile storage unit (a nonvolatile memory) such as a flash ROM, and a control function of the ECU is realized by causing the processor to load software stored in the nonvolatile memory into the volatile memory and to execute the software. Software stored in the nonvolatile memory of each ECU can be rewritten through wireless communication or the like and can be updated with software of a new version to improve the function of the ECU or to add a new vehicle control function.

When data constituting software stored in the nonvolatile memory of each ECU is fully written and arranged in a storage area of the nonvolatile memory, arrangement change of data of which content does not change occurs often and a large amount of data rewriting may be necessary even when only some content of the software is changed. In order to solve this problem, a technique of finishing the arrangement change of data of which content does not change in the unit of applications and avoiding a large amount of data rewriting at the time of updating of software by providing an unused area (a margin portion) for every plurality of applications constituting the software in the storage area of the nonvolatile memory has been proposed (for example, see Japanese Unexamined Patent Application Publication No. 2020-24579 (JP 2020-24579 A)).

SUMMARY

As described above, when an unused area (a margin portion) for every plurality of applications constituting software is provided in the storage area of the nonvolatile memory, a large amount of data rewriting can be avoided. However, when the software stored in the nonvolatile memory is loaded into the volatile memory and is executed, there is a likelihood that the unused area will also be loaded and a storage capacity of the volatile memory will not be efficiently used.

Therefore, the present disclosure provides an electronic control unit (ECU), a method, and a program that can enable efficient use of a storage capacity of a volatile memory.

An electronic control unit according to the present disclosure is an electronic control unit that is mounted in a vehicle, the electronic control unit including: a volatile memory; a nonvolatile memory that includes a storage area including a data portion to which data loaded into the volatile memory is written and a margin portion which is an unused portion corresponding to the data; and a control unit configured to load the data of the nonvolatile memory into the volatile memory. The nonvolatile memory stores valid portion information which is information indicating the data portion. The control unit is configured to load the data of the nonvolatile memory into a storage area of the volatile memory based on the valid portion information.

A method according to the present disclosure is a method that is performed by a computer which is mounted in a vehicle and which includes a processor, a volatile memory, and a nonvolatile memory, the method including a loading step of loading data of the nonvolatile memory, which includes a storage area including a data portion to which data loaded into the volatile memory is written and a margin portion which is an unused portion corresponding to the data, into the volatile memory. The loading step includes loading the data of the nonvolatile memory into a storage area of the volatile memory based on valid portion information which is stored in the nonvolatile memory and which is information indicating the data portion.

A program according to the present disclosure is a program that is executed by a computer which is mounted in a vehicle and which includes a processor, a volatile memory, and a nonvolatile memory, the program causing the computer to perform a loading step of loading data of the nonvolatile memory, which includes a storage area including a data portion to which data loaded into the volatile memory is written and a margin portion which is an unused portion corresponding to the data, into the volatile memory. The loading step includes loading the data of the nonvolatile memory into a storage area of the volatile memory based on valid portion information which is stored in the nonvolatile memory and which is information indicating the data portion.

According to the present disclosure, it is possible to provide an electronic control unit (ECU), a method, and a program that can enable efficient use of a storage capacity of a volatile memory.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

Figure 1:
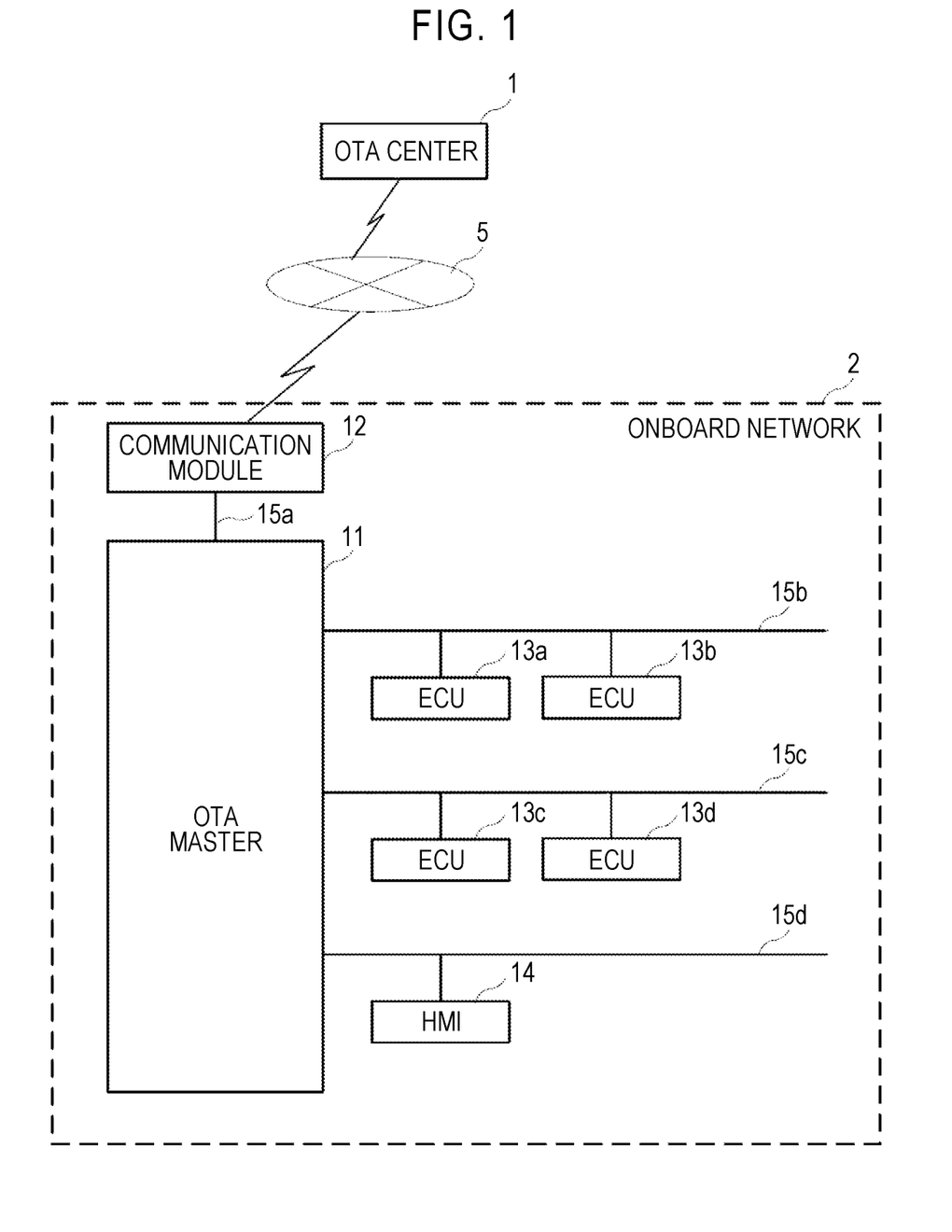
FIG. 1 is a block diagram illustrating an example of an overall configuration of a network system according to an embodiment.
Figure 2:
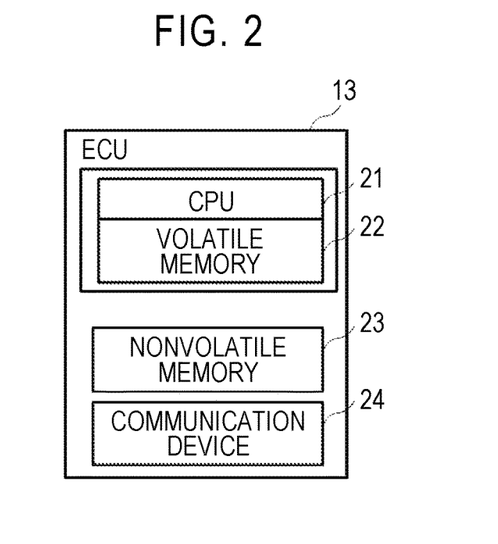
FIG. 2 is a block diagram schematically illustrating an example of a configuration of an ECU illustrated in FIG. 1.

FIG. 1 is a block diagram illustrating an example of an overall configuration of a network system according to a first embodiment. FIG. 2 is a block diagram schematically illustrating an example of a configuration of an ECU illustrated in FIG. 1.

The network system illustrated in FIG. 1 is a system that updates software of electronic control units (ECUs) 13a to 13d which are mounted in a vehicle and includes an OTA center 1 and an onboard network 2 that is mounted in the vehicle.

The OTA center 1 is able to communicate with an OTA master 11 which is mounted in the vehicle via a communication network 5 such as the Internet, includes, for example, a CPU, a RAM, a storage device, and a communication device (not illustrated), and manages update of software of the ECUs 13a to 13d mounted in the vehicle.

As illustrated in FIG. 1, the onboard network 2 includes an OTA master 11, a communication module 12, a plurality of ECUs 13a to 13d, and a human-machine interface (HMI) (for example, a display device of a car navigation system which can receive an input operation) 14. The OTA master 11 is connected to the communication module 12 via a bus 15a, is connected to the ECUs 13a and 13b via a bus 15b, is connected to the ECUs 13c and 13d via a bus 15c, and is connected to the HMI 14 via a bus 15d. The OTA master 11 can communicate with the OTA center 1 via the communication module 12 in a wireless manner. The OTA master 11 controls software update of an ECU to be updated (which may also be referred to as a "target ECU") out of the ECUs 13a to 13d based on update data acquired from the OTA center 1. The communication module 12 is a communication device that connects the onboard network 2 and the OTA center 1. The ECUs 13a to 13d control operations of constituents of the vehicle. The HMI 14 is used to perform various types of display such as display of the fact that there is update data, display of an approval request screen for requesting approval for software update from a user or a manager, and display of an update result at the time of performing software update of the ECUs 13a to 13d. In FIG. 1, four ECUs 13a to 13d are illustrated, but the number of ECUs is not limited thereto.

As illustrated in FIG. 2, each ECU 13 includes a central processing unit (CPU) 21 (a control unit), a volatile memory 22, a nonvolatile memory 23, and a communication device 24. The volatile memory 22 is, for example, a random access memory (RAM) and the nonvolatile memory 23 is, for example, a flash read-only memory (flash ROM). The CPU 21 realizes the functions of the ECU 13 by loading software (such as a program) read from the nonvolatile memory 23 into the volatile memory 22, performing processes using the volatile memory 22 as a work area, and communicating with another device via a bus according to necessity using the communication device 45.

The CPU 21 and the volatile memory 22 are formed as a system-on-a-chip (SoC) and are formed on a single semiconductor chip. Accordingly, there is a merit of an increase in speed of an operation process. On the other hand, the nonvolatile memory 23 is not formed on the semiconductor chip and is connected to the semiconductor chip by assembly or the like.

The OTA master 11 includes a microcomputer including a CPU, a RAM, a ROM, and a storage device and a communication device (not illustrated) that communicates with the communication module 12, the ECUs 13a to 13d, or the HMI 14 via a bus.

Here, a software updating process includes a downloading phase of downloading update data from the OTA center 1, an installation phase of transmitting the downloaded update data to a target ECU which is an update target and installing the update data in a storage area of the target ECU, and an activation phase of activating software of an update version installed in the target ECU.

Downloading is a process of receiving update data for updating software of an ECU transmitted from the OTA center 1 and storing the received update data in the storage device of the OTA master 11. The downloading phase includes control of a series of processes associated with downloading such as determination of whether to be able to perform downloading and verification of update data in addition to reception of update data. Installation is a process of writing a program of an update version (update software) to the nonvolatile memory of the target ECU which is an update target based on the downloaded update data. The installation phase includes control of a series of processes associated with installation such as determination of whether to be able to perform installation, transmission of update data, and verification of a program of an update version in addition to performing of installation. Activation is a process of activating (validating) the installed program of an update version. The activation phase includes control of a series of processes associated with activation such as determination of whether to be able to perform activation and verification of a performing result in addition to performing activation.

Update data which is transmitted from the OTA center 1 to the OTA master 11 may include one of update software of an ECU, compressed data obtained by compressing update software, and divided data obtained by dividing the update software or the compressed data. The update data may include an identifier (ECUID) for identifying the target ECU which is an update target and an identifier (a software ID of the ECU) for identifying non-updated software. The update data is downloaded as a distribution package, and the distribution package includes update data of a single ECU or a plurality of ECUs.

When the update data includes update software, the OTA master 11 transmits the update data (that is, update software) to the target ECU in the installation phase. When the update data includes compressed data, difference data, or divided data of update software, the OTA master 11 may transmit the update data to the target ECU and the target ECU may generate update software from the update data, or the OTA master 11 may generate update software from the update data and then transmit the update software to the target ECU. Here, generation of update software can be performed by decompressing compressed data or assembling difference data or divided data.

Installation of update software can be performed by the target ECU based on an installation request (a program update request) from the OTA master 11. Alternatively, the target ECU having received update data may autonomously perform installation without receiving an apparent instruction from the OTA master 11.

In this embodiment, for example, it is assumed that the OTA master 11 transmits update data which is difference data of update software to a target ECU and the target ECU generates update software from the update data (the difference data). For example, it is assumed that the target ECU installs the update software in response to an installation request (a program update request) from the OTA master 11.

Activation of the update software can be performed by the target ECU based on an activation request from the OTA master 11. Alternatively, activation may be autonomously performed by the target ECU having received update data without receiving an apparent instruction from the OTA master 11.

Figure 3:
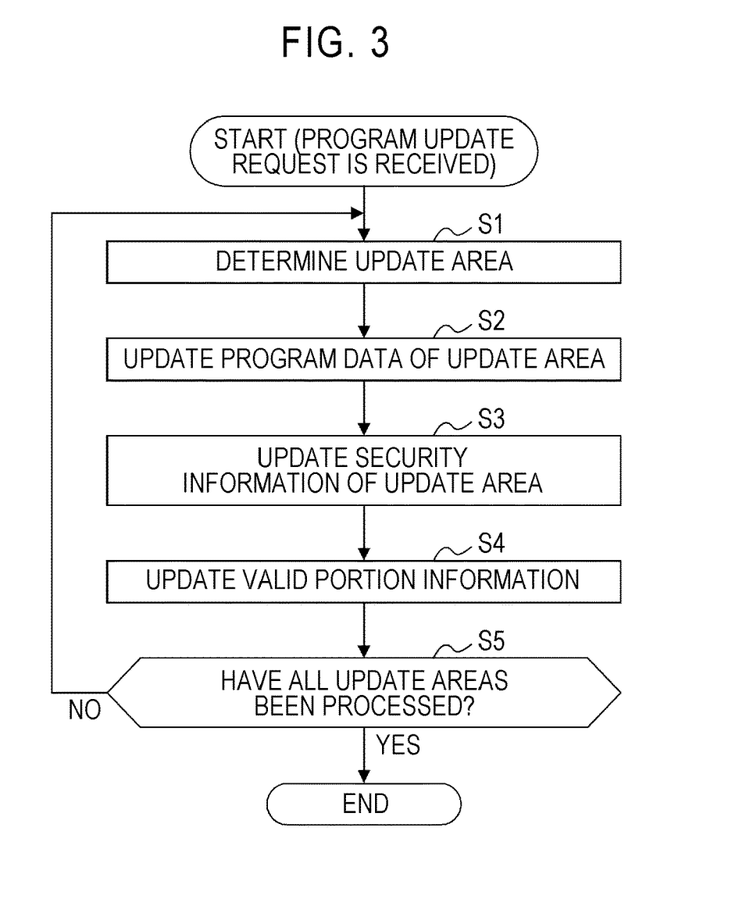
FIG. 3 is a flowchart illustrating an example of a control flow which is performed by an ECU according to the embodiment.
Figure 4:
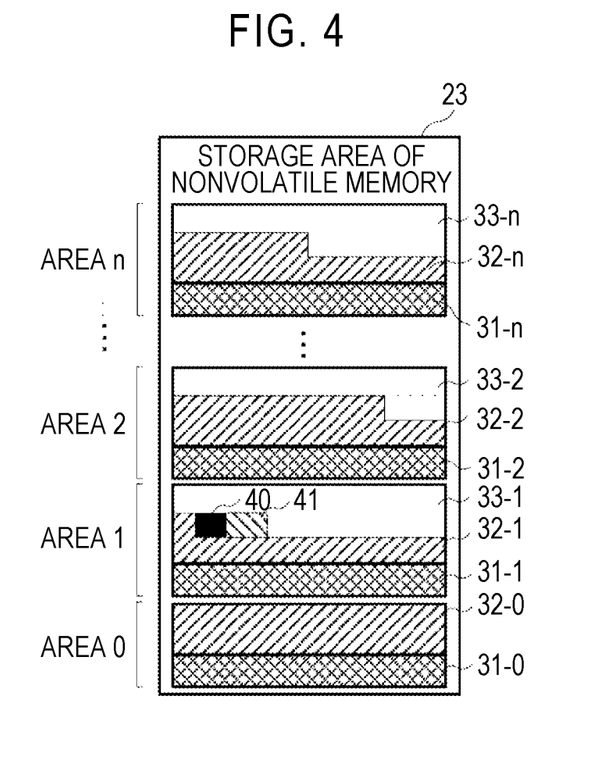
FIG. 4 is a diagram schematically illustrating a state in which data in a nonvolatile memory is updated through the control flow illustrated in FIG. 3.

FIG. 3 is a flowchart illustrating an example of a control flow causing an ECU 13 according to the embodiment to install update data in the nonvolatile memory 23 (to update software). FIG. 4 is a diagram schematically illustrating a state in which data in the nonvolatile memory 23 is updated through the control flow illustrated in FIG. 3.

As illustrated in FIG. 4, a storage area of the nonvolatile memory 23 includes Areas 0 to n. Areas 0 to n are not structural sections but sections based on addresses of the storage area. Loading-use information 31 (31-1 to 31-n) which is information used to load data into the volatile memory 22 and program data 32 (32-1 to 32-n) for realizing the function of the ECU 13 are stored in each of Areas 1 to n, and an unused area (a margin portion) 33 (33-1 to 33-n) is provided. The program data 32 is, for example, data of an application for realizing the function of the ECU 13, but the present disclosure is not limited thereto. The loading-use information 31 includes security information which is used for a security check such as a digital signature or a message authentication code (MAC) and valid portion information indicating an arrangement position (an address) of the program data 32. The loading-use information 31-0 and the program data 32-0 are stored in Area 0, but an unused area (a margin portion) is not provided therein. The loading-use information 31-0 of Area 0 includes security information but does not include valid portion information.

A control flow of causing an ECU 13 to install update data in the nonvolatile memory 23 (to update software) will be described below with reference to FIGS. 3 and 4. The control flow illustrated in FIG. 3 is started when the CPU 21 of an ECU 13 receives a program update request from the OTA master 11.

In Step S1, the CPU 21 determines an update area of the nonvolatile memory 23. For example, the CPU 21 determines Area 1 (Area 1 in which an update process is not performed) in FIG. 4 as an area to be updated. Thereafter, the control flow proceeds to Step S2.

In Step S2, the CPU 21 updates program data in the update area determined in Step S1. Specifically, the CPU 21 performs rewriting of changing a changed or added portion (difference data) and rewriting of performing arrangement change of a portion of which arrangement is changed due to the change in the program data 32 in the update area. For example, as illustrated in Area 1 of FIG. 4, the CPU 21 performs rewriting of changing a changed or added portion (difference data) 40 and performs rewriting of performing arrangement change on a portion 41 of which arrangement is shifted due to the change. Data rewriting based on the arrangement change due to change of data occurs when the program data 32 is updated in this way, but an amount of data rewriting can be curbed by providing an unused area (a margin portion) 33 as illustrated in FIG. 4. Thereafter, the control flow proceeds to Step S3.

In Step S3, the CPU 21 updates security information of the update area determined in Step S1. Specifically, the CPU 21 updates data of security information (such as a digital signature or a MAC) of the update area with program update performed in Step S2. For example, when Area 1 in FIG. 4 is the update area, the CPU 21 updates security information of the program data 32-1 with update of the program data 32-1 of Area 1. Thereafter, the control flow proceeds to Step S4.

In Step S4, the CPU 21 updates valid portion information of the update area determined in Step S1. Specifically, the CPU 21 updates valid portion information indicating an arrangement position (an address) of the program data 32 of the update area in response to the program update performed in Step S2. For example, when Area 1 in FIG. 4 is the update area, the CPU 21 updates the valid portion information indicating the arrangement position (address) of the program data 32-1 in response to update of the program data 32-1 of Area 1. Thereafter, the control flow proceeds to Step S5.

Since security information and valid portion information of the update area determined in Step S1 are updated through the processes of Steps S3 and S4, the loading-use information 31 is updated.

In Step S5, the CPU 21 determines whether all update areas have been processed, causes the control flow to return to Step S1 when the determination result is NO, and ends the control flow illustrated in FIG. 3 when the determination result is YES. As a result, all the update areas are processed.

As described above with reference to FIG. 4, an unused area (margin portion) 33 is not provided in Area 0 and valid portion information is not stored therein. This is because the program data 32-0 of Area 0 is program data which is used to load data of the nonvolatile memory 23 into the volatile memory 22 and does not need an unused portion 33 because there is no change in an amount of data due to the software update, and thus valid portion information is not necessary. In this way, since Area 0 does not include an unused area (a margin portion) 33 or valid portion information, the process of Step S4 in FIG. 3 is skipped when Area 0 is the update area. When an amount of data of the program data 32-0 in Area 0 changes due to the software update, an unused area 33 can also be provided in Area 0, valid portion information thereof can be stored, and the process of Step S4 in FIG. 3 can be performed, similarly to Areas 1 to n.

Figure 5:
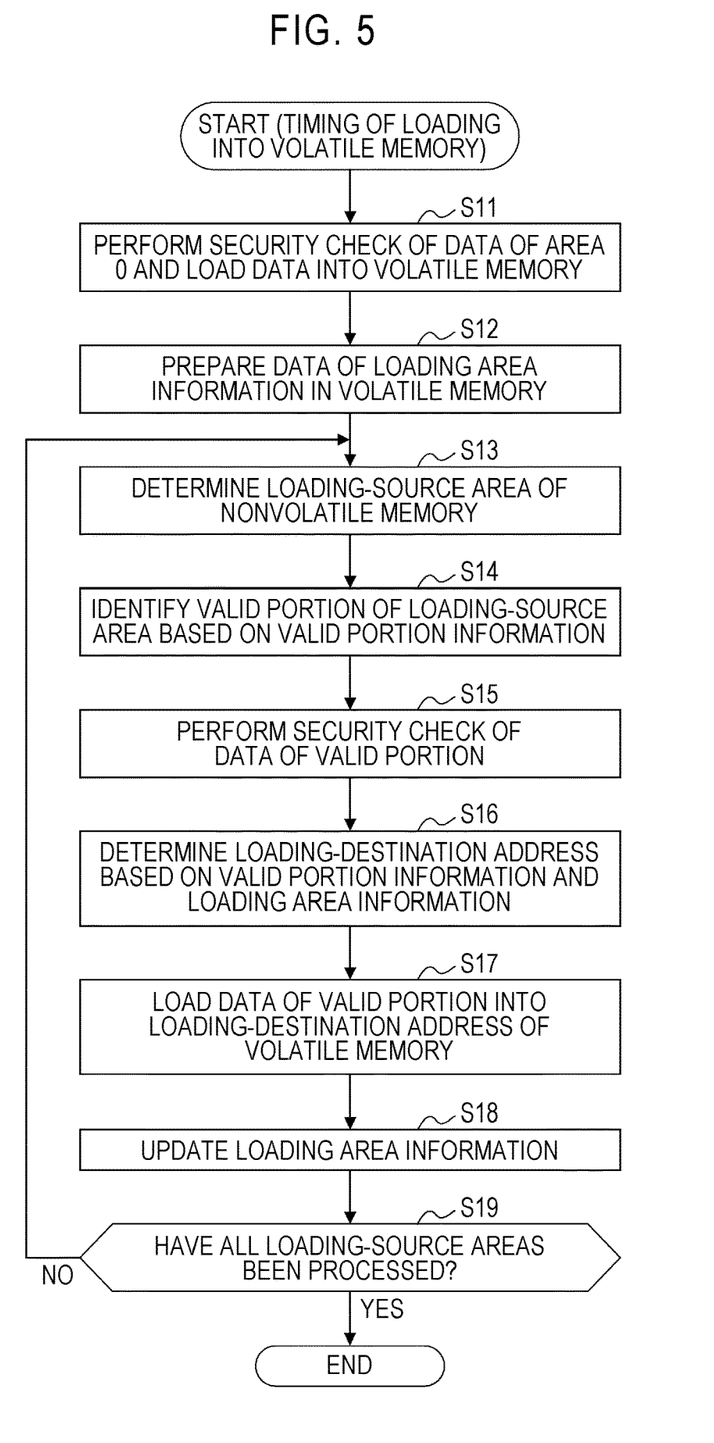
FIG. 5 is a flowchart illustrating an example of a control flow which is performed by an ECU according to the embodiment.
Figure 6:
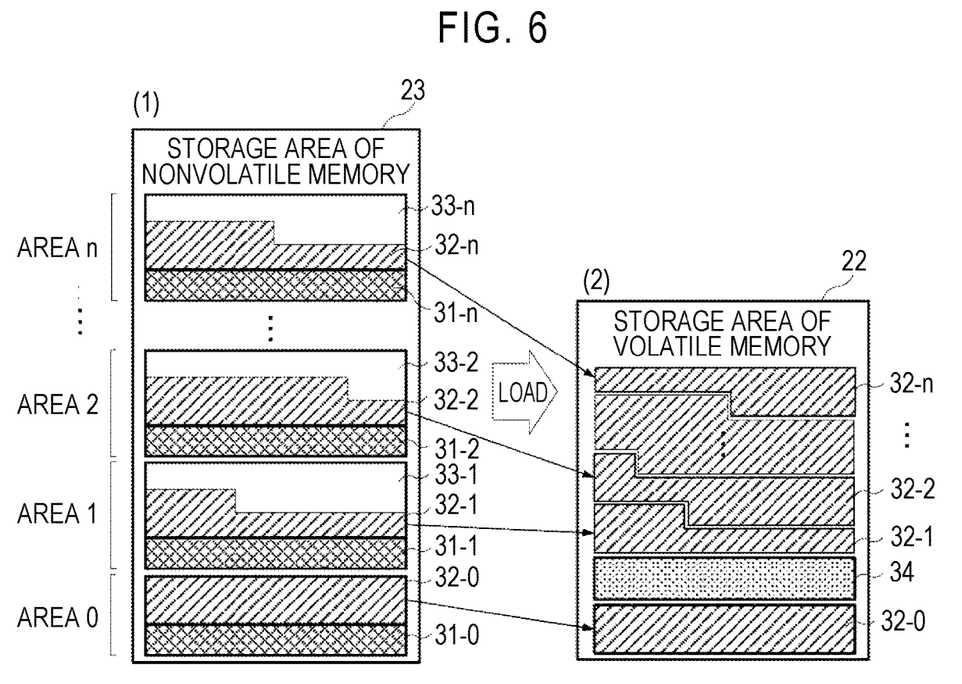
FIG. 6 is a diagram schematically illustrating a state in which data in a nonvolatile memory is loaded into a volatile memory through the control flow illustrated in FIG. 5.

FIG. 5 is a flowchart illustrating an example of a control flow of causing an ECU 13 according to the embodiment to load software (such as a program) stored in the nonvolatile memory 23 into the volatile memory 22. FIG. 6 is a diagram schematically illustrating a state in which software (such as a program) stored in the nonvolatile memory 23 is loaded into the volatile memory 22 through the control flow illustrated in FIG. 5. (1) of FIG. 6 illustrates a storage area of the nonvolatile memory 23 and (2) of FIG. 6 illustrates a state in which data (software) stored in the nonvolatile memory 23 is loaded into a storage area of the volatile memory 22. The storage area of the nonvolatile memory 23 illustrated in (1) of FIG. 6 is the same as described above with reference to FIG. 4 and thus description thereof will be omitted.

The control flow of loading software (such as a program) stored in the nonvolatile memory 23 into the volatile memory 22, which is performed by an ECU 13, will be described below with reference to FIGS. 5 and 6. The control flow illustrated in FIG. 5 is started at a predetermined timing (at the time of powering-on or resetting of the ECU 13) at which software in the nonvolatile memory 23 is loaded into the volatile memory 22.

In Step S11, the CPU 21 performs a security check of the program data 32-0 in Area 0 of the nonvolatile memory 23 and loads the program data 32-0 into the volatile memory 22. Specifically, as illustrated in FIG. 6, the CPU 21 performs a security check of the program data 32-0 in Area 0 using security information included in the loading-use information 31-0 of Area 0 and loads the program data 32-0 into the volatile memory 22. The program data 32-0 is data of a program for performing a process of loading data in the nonvolatile memory 23 into the volatile memory 22. Thereafter, the control flow proceeds to Step S12.

In Step S12, the CPU 21 prepares data of e loading area information in the volatile memory 22. Specifically, the CPU 21 executes the program data 32-0 loaded into the volatile memory 22 in Step S11, prepares loading area information 34 as illustrated in (2) of FIG. 6, and stores the loading area information 34 in the volatile memory 22. The loading area information 34 is information indicating an area (an address) into which data in the nonvolatile memory 23 has been loaded in the storage area of the volatile memory 22. Thereafter, the control flow proceeds to Step S13.

In Step S13, the CPU 21 determines a loading-source area in the nonvolatile memory 23. Specifically, the CPU 21 determines an area in which a loading process is not performed out of Areas 1 to n in the nonvolatile memory 23 as the loading-source area. For example, the CPU 21 determines Area 1 in (1) of FIG. 6 as the loading-source area. Thereafter, the control flow proceeds to Step S14.

In Step S14, the CPU 21 identifies a valid portion of the loading-source area determined in Step S13 based on the valid portion information. Specifically, the CPU 21 identifies a valid portion (an arrangement position (an address) of the program data 32 in the loading-source area) indicated by the valid portion information included in the loading-use information of the loading-source area determined in Step S13. For example, when Area 1 in (1) of FIG. 6 is the loading-source area, the CPU 21 identifies the arrangement position (address) of the program data 32-1 as a valid portion based on the valid portion information included in the loading-use information 31-1. Thereafter, the control flow proceeds to Step S15.

In Step S15, the CPU 21 performs a security check of the valid portion identified in Step S14. For example, when the arrangement position of the program data 32-1 in Area 1 in (1) of FIG. 6 is identified as the valid portion, the CPU 21 performs a security check of the program data 32-1 using the security information included in the loading-use information 31-1 of Area 1. Thereafter, the control flow proceeds to Step S16.

In Step S16, the CPU 21 determines a loading-destination address of the valid portion identified in Step S14 based on the valid portion information and the loading area information. An example in which the arrangement position of the program data 32-2 in Area 2 in (1) of FIG. 6 is identified as the valid portion will be specifically described below. The CPU 21 determines the loading-destination address of the program data 32-2 in the storage area of the volatile memory 22 based on the arrangement position (address) of the program data 32-2 indicated by the valid portion information included in the loading-use information 31-2 of Area 1. At this time, as illustrated in (2) of FIG. 6, the CPU 21 determines the loading-destination address of the program data 32-2 such that the storage area of the volatile memory 22 is fully filled based on the loading area information 34 (information indicating an area into which data of the nonvolatile memory 23 has been loaded). Thereafter, the control flow proceeds to Step S17.

In Step S17, the CPU 21 loads data of the valid portion identified in Step S14 into the loading-destination address of the volatile memory 22 determined in Step S16. Thereafter, the control flow proceeds to Step S18.

In Step S18, the CPU 21 updates the loading area information 34 of the volatile memory 22. For example, when the program data 32-1 and the program data 32-2 in (2) of FIG. 6 have been loaded into the storage area of the volatile memory 22, the CPU 21 updates the loading area information 34 such that it indicates the loaded area. Thereafter, the control flow proceeds to Step S19.

In Step S19, the CPU 21 determines whether all the loading-source areas have been processed, causes the control flow to return to Step S13 when the determination result is NO, and ends the control flow illustrated in FIG. 5 when the determination result is YES. As a result, all the update-source areas are processed and data (software) in the nonvolatile memory 23 is loaded into the volatile memory 22 as illustrated in FIG. 6.

As described above, according to the embodiment, by providing an unused area (a margin portion) 33 for each program data 32 (for each area) in the storage area of the nonvolatile memory 23 (see FIGS. 3 and 4), arrangement change of data of which content does not change can be finished in the unit of program data to avoid a large amount of data rewriting at the time of software update.

According to the embodiment, when data in the nonvolatile memory 23 is loaded into the volatile memory 22, a portion of the program data 32 other than the unused area (margin portion) 33 can be loaded into the volatile memory 22 using the valid portion information indicating the arrangement position (address) of the program data 32 (see FIGS. 5 and 6) and thus it is possible to effectively use the memory capacity of the volatile memory 22.

According to the embodiment, since the program data 32 can be fully written based on the loading area information indicating the area (address) into which data has been loaded in the volatile memory 22, it is possible to effectively use the memory capacity of the volatile memory 22.

In the embodiment, since the CPU 21 and the volatile memory 22 are formed as an SoC on a single semiconductor chip, it is possible to increase an arithmetic operation speed, but the capacity of the volatile memory 22 is relatively small and it is difficult to extend the capacity. According to the embodiment, since the memory capacity of the volatile memory 22 can be effectively used as described above, it is possible to overcome the demerit due to the configuration in which the CPU 21 and the volatile memory 22 are formed as an SoC on a single semiconductor chip.

MODIFIED EXAMPLES

In the aforementioned embodiment, an example in which the program data 32 in the nonvolatile memory 23 is fully loaded into the volatile memory 22 sequentially from Area 1 has been described (see FIG. 6). However, as long as data is fully loaded into the volatile memory 22, the program data 32 does not need to be loaded sequentially from Area 1.

In the aforementioned embodiment, an example in which the program data 32 in the nonvolatile memory 23 is fully loaded into the volatile memory 22 sequentially from Area 1 has been described (see FIG. 6). However, the arrangement positions may be determined such that the loading-destination addresses of all the program data 32 of Areas 1 to n of the nonvolatile memory 23 are fully filled, and then all the program data 32 in Areas 1 to n may be fully loaded into the volatile memory 22. In this case, the loading area information is information indicating an area (an address) into which data in the nonvolatile memory 23 is scheduled to be loaded in the storage area of the volatile memory 22.

In the aforementioned embodiment, an example in which the storage area of the nonvolatile memory 23 is partitioned into Areas 0 to n in the units of applications has been described above, but the present disclosure is not limited thereto.

In the aforementioned embodiment, the ECUs are described as an example, but the present disclosure is not limited thereto.

The functions of the ECUs described above in the embodiment can also be embodied as a method that is performed by a computer including a processor (CPU) and a memory, a program that is executed by the computer, or a non-transitory computer-readable storage medium having the program stored therein.

The technique according to the present disclosure can be applied to an electronic control unit (ECU).

What is claimed is:

1. An electronic control unit that is mounted in a vehicle, the electronic control unit comprising:
    a volatile memory;
    a nonvolatile memory that includes a storage area including (i) a data portion to which data that is to be loaded into the volatile memory is written and (ii) a margin portion which is an unused portion of the storage area that is available for storage of updates to the data in the data portion; and
    a control unit configured to load the data of the nonvolatile memory into the volatile memory, wherein
    the nonvolatile memory stores valid portion information which is information indicating a location of the data portion in the storage area of the nonvolatile memory,
    the control unit is configured to load the data stored in the storage area of the nonvolatile memory into a storage area of the volatile memory by accessing the data portion but not the margin portion based on the valid portion information,
    the storage area of the nonvolatile memory includes a plurality of the data portions and a plurality of the margin portions,
    the control unit is configured to fully load the data stored in the plurality of data portions of the nonvolatile memory but not the plurality of margin portions into the storage area of the volatile memory based on the valid portion information,
    the control unit is configured to store loading area information in the volatile memory, the loading area information indicating an area into which data is loaded in the storage area of the volatile memory,
    the control unit is configured to fully load the data stored in the plurality of data portions of the nonvolatile memory but not the plurality of margin portions into the storage area of the volatile memory based on the loading area information, and
    the control unit is configured to update the loading area information after fully loading the data of the plurality of data portions of the nonvolatile memory into the storage area of the volatile memory.

2. The electronic control unit according to claim 1, wherein the control unit and the volatile memory are formed on a single semiconductor chip.

3. A method that is performed by a computer which is mounted in a vehicle and which includes a processor, a volatile memory, and a nonvolatile memory, the method comprising:
    a loading step of loading data stored in the nonvolatile memory into the volatile memory, the nonvolatile memory including a storage area including (i) a data portion to which the data that is to be loaded into the volatile memory is written and (ii) a margin portion which is an unused portion of the storage area that is available for storage of updates to the data in the data portion, wherein
    the loading step includes loading the data stored in the storage area of the nonvolatile memory into a storage area of the volatile memory by accessing the data portion but not the margin portion based on valid portion information which is stored in the nonvolatile memory and which is information indicating a location of the data portion in the storage area of the nonvolatile memory,
    the storage area of the nonvolatile memory includes a plurality of the data portions and a plurality of the margin portions,
    the loading step includes fully loading the data stored in the plurality of data portions of the nonvolatile memory but not the plurality of margin portions into the storage area of the volatile memory based on the valid portion information,
    the method further includes storing loading area information in the volatile memory, the loading area information indicating an area into which data is loaded in the storage area of the volatile memory,
    the loading step fully loads the data stored in the plurality of data portions of the nonvolatile memory but not the plurality of margin portions into the storage area of the volatile memory based on the loading area information, and
    the method further includes updating the loading area information after fully loading the data of the plurality of data portions of the nonvolatile memory into the storage area of the volatile memory.

4. A non-transitory computer-readable storage medium on which is stored a program that is executable by a computer which is mounted in a vehicle and which includes a processor, a volatile memory, and a nonvolatile memory, the program causing the computer to perform:
    a loading step of loading data stored in the nonvolatile memory into the volatile memory, the nonvolatile memory including a storage area including (i) a data portion to which data that is to be loaded into the volatile memory is written and (ii) a margin portion which is an unused portion of the storage area that is available for storage of updates to the data in the data portion, wherein
    the loading step includes loading the data stored in the storage area of the nonvolatile memory into a storage area of the volatile memory by accessing the data portion but not the margin portion based on valid portion information which is stored in the nonvolatile memory and which is information indicating a location of the data portion in the storage area of the nonvolatile memory,
    the storage area of the nonvolatile memory includes a plurality of the data portions and a plurality of the margin portions,
    the loading step includes fully loading the data stored in the plurality of data portions of the nonvolatile memory but not the plurality of margin portions into the storage area of the volatile memory based on the valid portion information,
    the program further causes the computer to perform storing of loading area information in the volatile memory, the loading area information indicating an area into which data is loaded in the storage area of the volatile memory, the loading step fully loads the data stored in the plurality of data portions of the nonvolatile memory but not the plurality of margin portions into the storage area of the volatile memory based on the loading area information, and the program further causes the computer to perform updating of the loading area information after fully loading the data of the plurality of data portions of the nonvolatile memory into the storage area of the volatile memory.

* * * * *